(12) United States Patent
Vitek

(10) Patent No.: US 6,790,180 B2
(45) Date of Patent: Sep. 14, 2004

(54) APPARATUS, SYSTEMS, AND METHODS FOR MEASURING POWER OUTPUT OF AN ULTRASOUND TRANSDUCER

(75) Inventor: Shuki Vitek, Haifa (IL)

(73) Assignee: Insightec-TxSonics Ltd., Tirat Carmel (IL)

(*) Notice: Subject to any disclaimer, the term of this patent is extended or adjusted under 35 U.S.C. 154(b) by 0 days.

(21) Appl. No.: 10/005,845

(22) Filed: Dec. 3, 2001

(65) Prior Publication Data

US 2003/0105398 A1 Jun. 5, 2003

(51) Int. Cl.⁷ .................................................. A61B 8/00
(52) U.S. Cl. ........................................................ 600/438
(58) Field of Search .................... 73/570, 1.83, 1.86, 73/595–633, 634–646; 210/748; 55/15; 600/437, 443, 459, 407–412; 128/916, 898–899; 367/7, 11, 130, 138

(56) References Cited

U.S. PATENT DOCUMENTS

| | | | |
|---|---|---|---|
| 4,625,542 A | * 12/1986 | Nelson | 73/1.83 |
| 5,474,064 A | * 12/1995 | Rohrberg | 600/300 |
| 5,979,457 A | * 11/1999 | Rohrberg | 600/443 |
| 6,055,859 A | * 5/2000 | Kozuka et al. | 73/570 |

FOREIGN PATENT DOCUMENTS

| | | |
|---|---|---|
| DE | 892 516 C | 10/1953 |
| DE | 930 416 C | 7/1955 |
| DE | 939 406 C | 2/1956 |

OTHER PUBLICATIONS

Non–Certified translation made of DE, 930 416; Applicant: Atlas–Werke A.G., Bremen, 4 pages.
Patent Abstracts of Japan, vol. 010, No. 284 (P–501), Sep. 26, 1986 & JP 61 105429 A (Matsushita Electric Ind Co Ltd) May 23, 1986 abstract.
Patent Abstracts of Japan, vol. 016, No. 105 (P–1325), Mar. 16, 1992 & JP 03 282332 A (Matsushita Electric Ind Co Ltd) Dec. 12, 1991 abstract.
Patent Abstracts of Japan, vol. 010, No. 284 (P–501), Sep. 26, 1986 & JP 61 105428 A (Matsushita Electric Ind Co Ltd) May 23, 1986 abstract.

* cited by examiner

*Primary Examiner*—Ali Imam
(74) *Attorney, Agent, or Firm*—Bingham McCutchen LLP

(57) ABSTRACT

Apparatus, systems, and methods are provided for measuring the power of acoustic energy transmitted by an ultrasound transducer. The apparatus includes a container including a liquid therein, and a buoyant body floating at a first level in the liquid. When acoustic energy is transmitted by the ultrasound transducer towards the buoyant body, the buoyant body floats at a second, different level in the liquid. The displaced volume of the buoyant body from the first level to the second level is directly related to the power of the acoustic energy transmitted by the ultrasound transducer. The apparatus may output signals corresponding to the level at which the buoyant body floats. The signal may be routed to a controller for adjusting the power output by the ultrasound transducer.

24 Claims, 4 Drawing Sheets

US 6,790,180 B2

APPARATUS, SYSTEMS, AND METHODS FOR MEASURING POWER OUTPUT OF AN ULTRASOUND TRANSDUCER

FIELD OF THE INVENTION

The present invention relates generally to systems and methods for indicating acoustic energy power output, and more particularly to systems and methods for measuring power of acoustic energy transmitted by an ultrasound transducer, such as a focused ultrasound transducer.

BACKGROUND

Focused ultrasound systems have been suggested for directing acoustic energy towards a target tissue region within a patient, such as a cancerous or benign tumor, to necrose or otherwise treat the tissue region with thermal energy. For example, a piezoelectric transducer located outside the patient's body may be used to focus high intensity acoustic waves, such as ultrasonic waves (acoustic waves with a frequency greater than about twenty kilohertz (20 kHz), and more typically between fifty KiloHertz and five MegaHertz (0.05–5 MHz)), at an internal tissue region of a patient to therapeutically treat the tissue region. The ultrasonic waves may be used to ablate a tumor, thereby obviating the need for invasive surgery. Such a sonic transducer system is disclosed in U.S. Pat. No. 4,865,042 issued to Umemura et al.

The acoustic energy emitted from such a system may be focused at a desired focal zone to provide a desired energy level in the target tissue region. To increase the size of the necrosed region, more acoustic energy may be applied to the focal zone, for example, by increasing the amplitude of the ultrasonic waves. This generally increases the size of the tissue region that is necrosed at the focal zone by the sonication, and consequently may reduce the number of sonications needed to treat an entire tissue structure, such as a tumor. Increasing the ultrasonic power, however, also increases the amount of energy that passes through the tissue on either side of the focal zone. This may cause undesired pain to the patient, heating, and/or necrosis of tissue outside of the target region, particularly in the "near field," i.e., the region between the transducer and the focal zone. Thus, it is important to precisely control the amount of acoustic energy delivered to a patient.

Controlling the amount of acoustic energy delivered to a patient requires knowledge of the ultrasonic power output of the transducer system. Though power output may be calculated theoretically, actual measurements are necessary to account for changes that may occur in the system over time and/or for variations in manufacturing, materials and environment.

Accordingly, apparatus, systems and, methods for indicating ultrasonic power output from a focused ultrasound transducer would be considered useful.

SUMMARY OF THE INVENTION

The present invention is directed to apparatus, systems, and methods for indicating or measuring power output from an ultrasound transducer, such as a focused ultrasound transducer.

For example, an ultrasound transducer may include one or more piezoelectric transducers, drive circuitry coupled to the transducer, and a controller coupled to the drive circuitry. The drive circuitry may be configured for providing drive signals to the transducer such that the transducer emits acoustic energy towards a target tissue region within a patient's body. The controller may be configured for controlling the drive circuitry to change parameters of the drive signals, e.g., frequency, amplitude, and/or phase, and/or to perform other operations.

An apparatus or system for indicating or measuring the power of the acoustic energy transmitted by an ultrasound transducer may include a container or housing including one or more fluids therein, such as degassed water, and a buoyant body floating at a first level in the fluid. By impacting the buoyant body with acoustic energy, e.g., converging ultrasonic waves, output by the ultrasound transducer, the buoyant body may float at a second, different level in the fluid. Under certain conditions, the displacement of the buoyant body from the first level to the second level may correspond to the power of the acoustic energy transmitted by the ultrasound transducer. The buoyant body may have a wave receiving surface positioned at least partially in or adjacent to the region towards which the acoustic energy is directed. The wave receiving surface may be oriented towards the transducer such that acoustic energy transmitted from the transducer may strike the wave receiving surface, thereby causing the buoyant body to float at a different level within the fluid.

The apparatus or system may output one or more signals, such as electrical signals and/or wireless signals, corresponding to the level at which the buoyant body floats and/or corresponding to displacement of the buoyant body relative to a reference point. The signals may be routed to a controller coupled to the ultrasound transducer for controlling the power output of the ultrasound transducer.

A method is also provided for measuring power of acoustic energy transmitted by an ultrasound transducer. A buoyant body may be provided floating at a first level in a fluid adjacent an ultrasound transducer. For example, a container including one or more fluids therein may be disposed adjacent the transducer, and the buoyant member may be provided floating or suspended in the fluid at the first level when the transducer is inactive.

Acoustic energy, e.g., ultrasonic waves, may be directed from the ultrasound transducer towards a surface of the buoyant member, causing the buoyant member to float at a second level in the fluid. Displacement of the buoyant member from the first level to the second level may be used to indicate the power of the acoustic energy directed against the surface. Optionally, one or more signals, e.g., electrical and/or wireless signals, related to the level of the buoyant body may be generated, and the signals may be used to control the power output from the ultrasound transducer.

Other objects and features of the present invention will become apparent from consideration of the following description taken in conjunction with the accompanying drawings.

BRIEF DESCRIPTION OF THE DRAWINGS

Preferred embodiments of the present invention are illustrated by way of example, and not by way of limitation, in the figures of the accompanying drawings, in which like reference numerals refer to like components, and in which.

DETAILED DESCRIPTION OF EXAMPLE EMBODIMENTS

Figure 1:
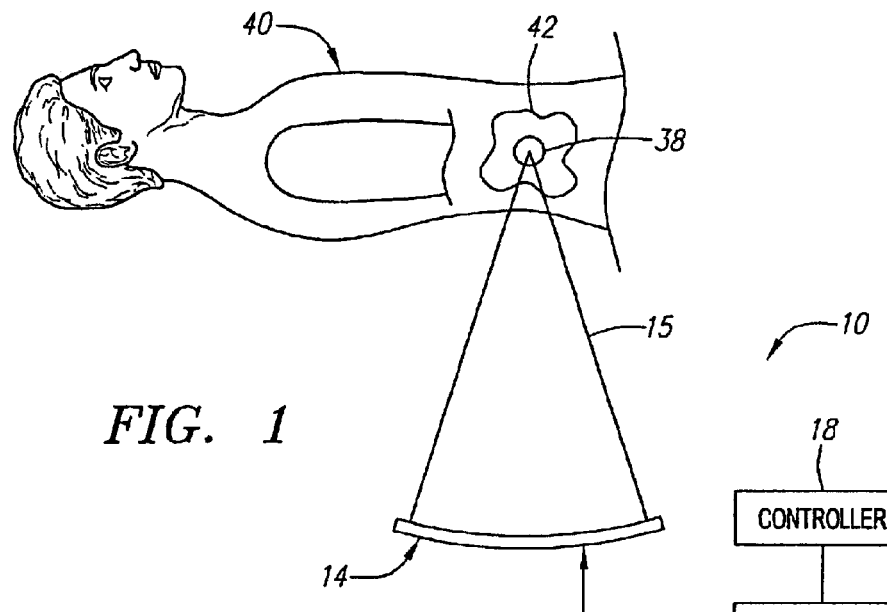
FIG. 1 is a diagram of an ultrasound transducer focusing ultrasonic energy at a target tissue region within a patient.

Turning now to the drawings, FIG. 1 shows an exemplary embodiment of a focused ultrasound system 10 including an ultrasound transducer 14 that may direct acoustic energy represented by beam 15 towards a target mass 42, typically a tumor, within a patient 40. The ultrasound transducer 14 may include a single transducer element or may include multiple transducer elements, together providing a transducer array.

In one embodiment, the transducer 14 may have a concave or bowl shape, such as a "spherical cap" shape, i.e., having a substantially constant radius of curvature such that the transducer 14 has an inside surface defining a portion of a sphere. Alternatively, the transducer 14 may have a substantially flat configuration (not shown), and/or may include an outer perimeter that is generally, but not necessarily, circular (not shown). The transducer 14 may be divided into any desired number of rings and/or sectors (not shown). In one embodiment, the transducer 14 may have an outer diameter of between about eight and twelve centimeters (8–12 cm), a radius of curvature between about eight and sixteen centimeters (8–16 cm), and includes between ten and thirty (10–30) rings and between four and sixteen (4–16) sectors.

In alternative embodiments, the transducer 14 may include one or more transducer elements having a variety of geometric shapes, such as hexagons, triangles, squares, and the like, and may be disposed about a central axis, preferably but not necessarily, in a substantially uniform or symmetrical configuration. The configuration of the transducer 14, however, is not important to the present invention, and any of a variety of ultrasound transducers may be used, such as flat circular arrays, linear arrays, and the like. Additional information on the construction of transducers appropriate for use with the present invention may be found, for example, in co-pending application Ser. No. 09/884,206, filed Jun. 19, 2000. The disclosure of this application and any references cited therein are expressly incorporated herein by reference.

Returning to FIG. 1, the transducer 14 may be mounted within a casing or chamber (not shown) filled with degassed water or similar acoustically transmitting fluid. The chamber may be located within a table (not shown) upon which a patient 40 may be disposed, or within a fluid-filled bag mounted on a movable arm that may be placed against a patient's body (not shown). The top of the table generally includes a flexible membrane (not shown) that is substantially transparent to ultrasound, such as mylar, polyvinyl chloride (PVC), or other suitable plastic material. A fluid-filled bag (not shown) may be provided on the membrane that may conform easily to the contours of the patient 40 disposed on the table, thereby acoustically coupling the patient 40 to the transducer 14 within the chamber. In addition or alternatively, acoustic gel, water, or other fluid may be provided between the patient 40 and the membrane to facilitate further acoustic coupling between the transducer 14 and the patient 40.

A positioning system (not shown) may be connected to the transducer 14 for mechanically moving the transducer 14 in one or more directions, and preferably in any of three orthogonal directions. Alternatively, a focal distance (a distance from the transducer 14 to a focal zone 38 of the acoustic energy emitted by the transducer 14) may be adjusted electronically, mechanically, or using a combination of mechanical and electronic positioning. Exemplary transducers and positioning systems are disclosed in co-pending application Ser. Nos. 09/556,095, and 09/557,078, both filed Apr. 21, 1100. The disclosures of these references and any others cited therein are expressly incorporated herein by reference.

Returning to FIG. 1, the transducer 14 is coupled to a driver 16 and/or a controller 18 for generating and/or controlling the acoustic energy emitted by the transducer 14. The driver 16 generates one or more electronic drive signals, which, in turn, are controlled by controller 18. The transducer 14 converts the electronic drive signals into acoustic energy represented by the energy beam 15. The vibrational energy propagated by the transducer 14 is transmitted through a target medium, such as degassed water, within the chamber.

The controller 18 and/or driver 16 may be separate or integral components of the transducer 14. It will be appreciated by one skilled in the art that the operations performed by the controller 18 and/or driver 16 may be performed by one or more controllers, processors, and/or other electronic components, including software or hardware components. Thus, the controller 18 and/or the driver 16 may be provided as parts of the transducer 14, and/or as a separate subsystem. The terms controller and control circuitry may be used herein interchangeably, and the terms driver and drive circuitry may be used herein interchangeably.

The driver 16 may generate drive signals in the ultrasound frequency spectrum that may be as low as twenty kilohertz (20 KHz), and that typically range from 0.5 to 10 MHz. Preferably, the driver 16 provides electrical drive signals to the transducer 14 at radio frequencies (RF), for example, between about 0.5–10 MHz, and more preferably between about 1.0 and 2.0 MHz. When electrical drive signals are provided to the transducer 14, the transducer 14 emits acoustic energy 15 from its inside surface, as is well known to those skilled in the art.

The controller 18 may control the amplitude, and therefore the intensity or power of the acoustic waves transmitted by the transducer 14. The controller 18 may also control a phase component of the drive signals to respective elements of the transducer 14, e.g., to control a shape of a focal zone 38 generated by the transducer 14 and/or to move the focal zone 38 to a desired location. For example, the controller 18 may control the phase shift of the drive signals based upon a radial position of respective transducer elements of the transducer 14, e.g., to adjust a focal distance of the focal plane (i.e., the distance from the face of the transducer 14 to the center of the focal zone 38). In addition or alternatively, the controller 18 may control the positioning system to move the transducer 14, and consequently the location of the focal zone 38 of the transducer 14, to a desired location, i.e., within the target tissue region 42.

As explained above, the transducer 14 converts the electronic drive signals into acoustic energy, represented by energy beam 15. As the acoustic energy 15 passes through the patient's body, the acoustic energy 15 is converted to heat, which may raise the temperature of target mass 42. The acoustic energy 15 may be focused on the target mass 42 to raise the temperature of the target mass tissue 42 sufficiently to necrose the tissue 42, while minimizing damage to surrounding healthy tissue. Therefore, it may be important to measure and/or control the power of the acoustic energy 15 so that healthy tissue in the patient 40, particularly in the near field, is not overheated by acoustic energy 15.

Figure 2:
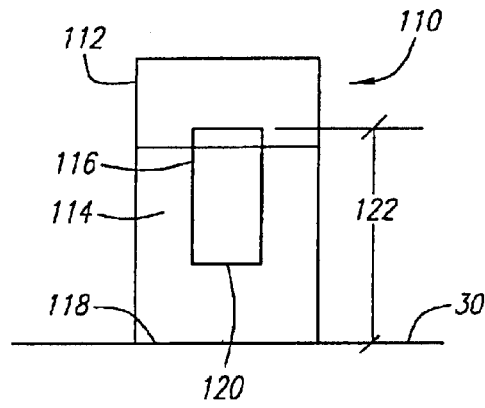
FIG. 2 is a side view of an apparatus for indicating the power output of an ultrasound transducer.

FIG. 2 shows an apparatus 110 for indicating or measuring the power output of a focused ultrasound transducer, such as the transducer 14. The apparatus 110 includes a container or housing 112 containing a liquid 114, and a buoyant body 116 floating in the liquid 114. The container 112 may be formed from transparent material so that the liquid 114 and buoyant body 116 may be observed through a wall of the container 112. Alternatively, the container 112 may be formed from any suitable material, including plastics and/or metals, such as stainless steel. The liquid 114 may be any liquid suitable for use in conjunction with the container 112 and buoyant body 116, such as water, which may be acoustically coupled with the transducer 14. In addition, the bottom 118 of the container 112 is preferably acoustically transparent to further enhance acoustically coupling the liquid 114 with the transducer 14.

The buoyant body 116 may be any structure that floats when placed in the liquid 114, i.e., such that the buoyant body 116 does not tend to sink to a bottom 118 of the container 112. The buoyant body 116 may float at a first level 122, wherein the buoyant body 116 is partially submerged in the liquid 114. Alternatively, the buoyant body 116 may be entirely submerged, yet suspended, within the liquid 114, i.e., as long as the buoyant body 116 does not tend to sink to the bottom 118. Thus, as used herein, the term "floating" refers to the buoyant body 116 maintaining a stable state partially or entirely submerged within the liquid 114 without sinking to the bottom 118 of the container 112. The buoyant body 116 may be formed from any suitable materials, including plastics and/or metals, may be solid or may include hollow portions, and/or may have adjustable-volume portions to permit adjustment of the overall specific gravity of the buoyant body 116.

The buoyant body 116 may have a wave receiving surface 120 adapted to be impinged by acoustic energy waves. The wave receiving surface 120 may be formed from a material capable of at least partially absorbing acoustic energy striking the wave receiving surface 120. For example, the material may be an absorbing mat that may be formed on, attached to, or otherwise provided on a desired surface of the buoyant body 116. Preferably, the absorbing mat absorbs substantially all of the acoustic energy striking it, although alternatively the material may partially reflect acoustic energy striking the wave receiving surface 120.

Preferably, the wave receiving surface 120 is located on a bottom surface of the buoyant body 116 (e.g., when the apparatus 110 is disposed above a transducer that is configured for transmitting acoustic energy upwardly). Alternatively, the wave receiving surface may be provided on another surface of the buoyant body 116, e.g., a top surface (not shown), that may be oriented towards the transducer 14 (e.g., when the transducer is configured for transmitting acoustic energy downwardly).

The apparatus 110 operates, in part, based upon Archimedes' principle: the upward force on any object floating or immersed in a fluid is equal to the weight of fluid the object displaces. Thus, the net upward force on a floating object, i.e., the buoyant force, is the product of the submerged volume of the object (or equivalently the volume of the fluid displaced), the density of the fluid, and acceleration due to gravity. In other words, the buoyant force equals the weight of the displaced liquid 114. If the buoyant body 116 weighs less than the volume of liquid 114 displaced by the buoyant body 116, then the buoyant body 116 may float in the liquid 114. If the buoyant body 116 weighs more than the volume of liquid 114 equivalent to the total volume of the buoyant body 116, then the buoyant body may sink to the bottom 118 of the container 112.

In the apparatus, systems, and methods described herein, the density or specific gravity, of the buoyant body 116 is preferably less than the density of the liquid 114. Thus, when the liquid 114 is water, e.g., degassed water, the specific gravity of the buoyant body 116 is less than unity. Therefore, the buoyant body 116 may float at a first level 122 where the weight of the liquid 114 displaced by the buoyant body 116 equals the weight of the buoyant body 116. At this equilibrium level 122 the gravitational force on the buoyant body 116 is equal to the upward buoyant force on the buoyant body 116.

Figure 3:
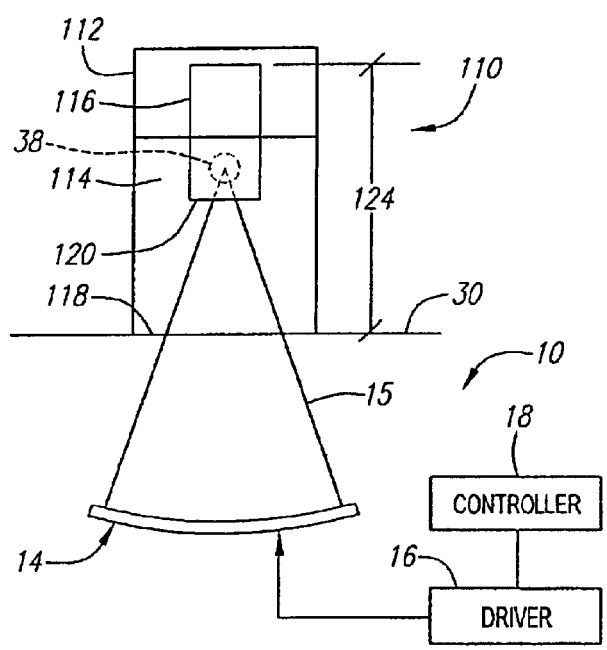
FIG. 3 is a side view of the apparatus of FIG. 2 with an ultrasound transducer focusing ultrasonic energy toward the apparatus.

Turning to FIG. 3, when acoustic energy 15 is directed at the wave receiving surface 120, the buoyant body 116 will rise and float at a second level 124 in the liquid 114. The acoustic energy 15 imparts a force on the buoyant body 116, which absorbs and/or reflects the acoustic energy 15. With the wave receiving surface 120 being an absorbing mat, substantially all of the force generated by the acoustic energy 15 is absorbed by the wave receiving surface 120. Preferably, the acoustic energy 15 is focused towards a region beyond the wave receiving surface 120, which may reduce heating of the wave receiving surface 120 and/or the buoyant body 116 by the acoustic energy 15.

The force applied to the buoyant body 116 is referred to herein as the "Radiation Force" or "Radiation Pressure." Its magnitude is frequency independent and is proportional to the total power that is either absorbed or reflected by the buoyant body 116, according to the following equation:

$$\text{Force} = k * P/c;$$

where "P" represents Power, "c" denotes propagation velocity, and "k" is a constant that ranges from 1.0 for a perfect absorber to 2.0 for a perfect reflector. Thus, if the wave receiving surface 120 does not absorb substantially all of the acoustic energy 15 striking it, the constant "k" may be adjusted to compensate for any reflection.

The buoyant body 116 floats vertically higher in the liquid 114 when impinged by the acoustic energy 15, as shown in FIG. 3, because the acoustic energy 15 imparts an upward Radiation Force on the buoyant body 116. As the buoyant body 116 moves upwardly, less of the buoyant body 116 is submerged in the liquid 114. Thus, as the buoyant body 116 moves upward, the buoyant body 116 displaces less liquid 114, and the upward buoyant force provided by the displaced liquid 114 decreases accordingly. The buoyant body 116 continues to move upward until the decrease in buoyant force and the upward Radiation Force supplied by the ultrasonic energy beam 15 reach a new state of equilibrium. At this second equilibrium level 124, the gravitational downward force on the buoyant body 116 is substantially equal to the sum of the upward buoyant force on the buoyant body 116 and the upward Radiation Force generated by the acoustic energy 15. Thus, the volume of the buoyant body 116 displaced from the liquid 114 may be directly proportional to the force of the acoustic energy 15.

In a preferred embodiment, at least the portion of the buoyant body 116 that emerges from the liquid 114 when the buoyant body 116 moves from the first level 122 to the second level 124 has a uniform cross-section about a vertical axis. More preferably, the entire buoyant body 116 has a uniform cross-section about a vertical axis. With such a uniform cross-section, the amount of vertical displacement of the buoyant body 116 from the first level 122 to the second level 124 may be substantially linearly related to displacement volume, and, consequently, to the upward Radiation Force applied to the buoyant body 116 by the acoustic energy 15. Since the Radiation Force is directly proportional to the power of the acoustic energy, the apparatus may be used to measure the power of the acoustic energy present striking the wave receiving surface 120 of the buoyant body 116.

Preferably, the acoustic energy 15 is focused directly vertically above the transducer 14, e.g., such that the focal zone is located beyond the wave receiving surface 120, for example, within the buoyant body 116. Thus, the displacement of the buoyant body 116 may directly measure the power of the acoustic energy 15 directed towards the buoyant body 116. If, however, the transducer 14 directs the acoustic energy at an angle relative to a vertical axis, the displacement of the buoyant body 116 may only measure a vertical component of the power generated by the acoustic energy 15, as will be appreciated by those skilled in the art.

Returning to FIG. 3, the apparatus 110 may be positioned above the transmitting surface of the transducer 14, e.g., in a similar location at which a patient may be positioned. For example, the transducer 14 may be mounted within a chamber (not shown) filled with degassed water or similar acoustically transmitting fluid. The chamber may be located within a table (not shown), including a flexible membrane (not shown) on top of the table. Preferable, the membrane is substantially transparent to ultrasound, such as mylar, polyvinyl chloride (PVC), or other suitable plastic material. The apparatus 110 may be disposed on the flexible table membrane, e.g., such that the bottom 118 of the container 112 substantially engages the flexible membrane. A fluid-filled bag (not shown) may be provided on the membrane that may conform easily to the contours of the apparatus 110 disposed on the table, thereby further acoustically coupling the apparatus 110 to the transducer 14. In addition or alternatively, acoustic gel, water, or other fluid may be provided between the apparatus 110 and the membrane to facilitate further acoustic coupling between the transducer 14 and the apparatus 110.

In an alternative embodiment, the apparatus 110 may also be used to indicate acoustic energy directed downwardly into the container 112. For example, the container 112 may include multiple fluids therein having different densities and being generally insoluble in one another (not shown). If first and second fluids are included in the container 112, the first fluid, e.g., a heavy oil may have a first density greater than a second density of the second fluid, e.g., water. Thus, the first fluid may settle to the bottom and the second fluid may rise towards the top, thereby creating a boundary between the two fluids. If the buoyant body 116 has a density that is less than the first fluid, yet greater than the second fluid, the buoyant body 116 may float about the boundary.

By directing acoustic energy 15 from a transducer 14 downwardly towards a buoyant body 116 in such a fluid-filled container 112, the buoyant body 116 may float vertically lower relative to the boundary between the fluids, such that the buoyant body 116 displaces an additional volume of the first fluid. This displacement of the buoyant body 112 may be related to the power of the acoustic energy 15.

To facilitate acoustically coupling the buoyant body 116 to a downwardly oriented transducer, the second or upper fluid may be water, e.g., degassed water, and the like. For an upwardly oriented transducer, such as those described above, the upper fluid may simply be air or other gases, whereupon the principles of operating the apparatus are as described above.

Returning to FIGS. 2 and 3, before using the apparatus 110 to measure ultrasonic power, the apparatus 110 may be calibrated. For example, the apparatus 110 may be calibrated by directing a known power level of acoustic energy 15 vertically (up or down) against the wave receiving surface 120 of the buoyant body 116, and measuring the corresponding vertical displacement of the buoyant body 116. Optionally, to focus the acoustic energy 15 transmitted by the transducer 14 against the buoyant body 116, the focal distance (the distance from the transducer 14 to a focal zone 38) may be adjusted using known methods such that the focused energy is disposed beyond the wave receiving surface 120.

Given a uniform cross-section buoyant body 116, the magnitude of the vertical displacement of the buoyant body 116 from the first level 122 (at zero power) to another level due to a known power level of acoustic energy may define a power-to-displacement relationship of a given transducer 14 in combination with the apparatus 110. Thereafter, the vertical (up or down) component of acoustic energy of the given transducer 14 may be measured by applying an unknown amount of acoustic energy to the buoyant body 116, and measuring the vertical displacement of the buoyant body 116, and applying the known power-to-displacement relationship.

Figure 4:
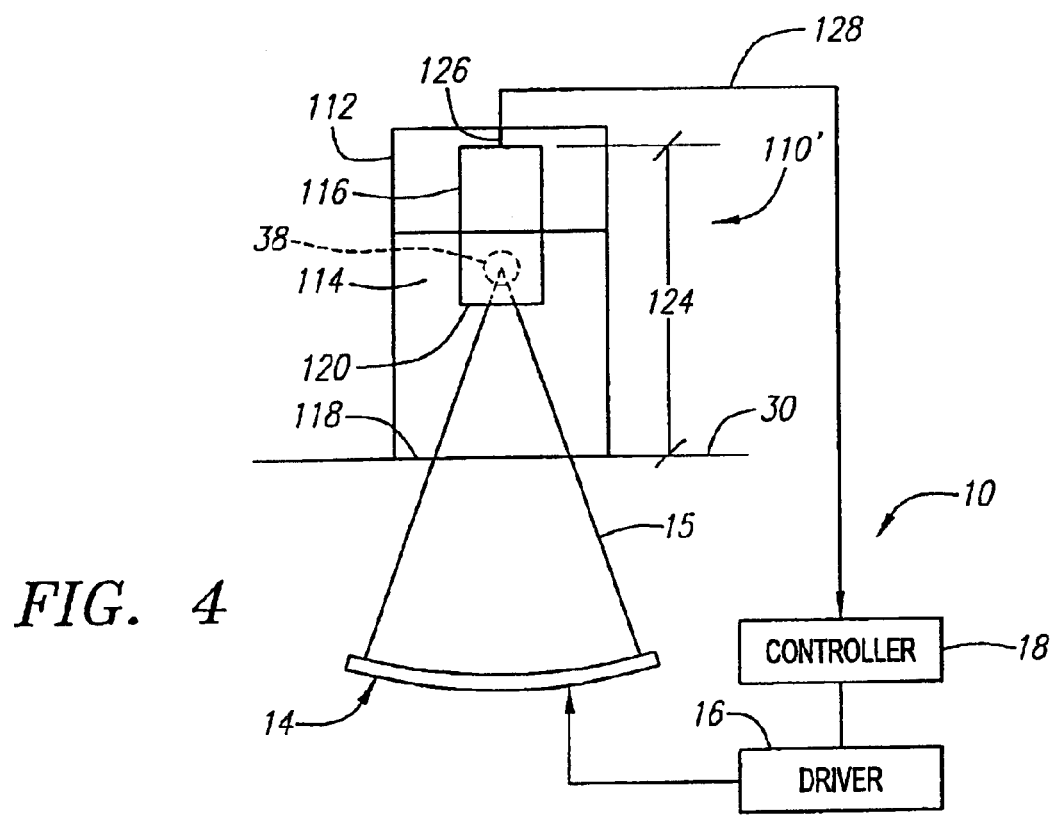
FIG. 4 is a side view of another apparatus for indicating the power output of an ultrasound transducer with an ultrasound transducer directing acoustic energy toward the apparatus.

Turning to FIG. 4, a level indicator 126 may be added to the apparatus 110', e.g., to facilitate measuring the vertical displacement of the buoyant member 116. The level indicator 126 may be any type of device that facilitates observing or measuring linear movement, such as a graduated scale, similar to a ruler or any object with gradient markings (not shown).

In addition or alternatively, the level indicator 126 may include a transducer and/or measurement electronics, such as a linear variable differential transformer (LVDT) or any other suitable displacement-measuring transducer. In order to measure movement of the buoyant member 116 relative to the container 112, the level indicator 126 may be attached to or formed on the container 112. Alternatively, the level indicator 126 may be attached to the buoyant member 116, and relative movement between the level indicator 126 and the container 112 (or an object fixed relative the container 112) may be measured.

When the level indicator 126 includes measurement electronics, the level indicator 126 may output one or more electrical signals corresponding to the vertical level of the buoyant member 116. For example, the signal may indicated the level of a specific portion of the buoyant member 116, such as the ultrasonic wave receiving surface 120, or the signal may be proportional to movement relative to a reference point, e.g., the first level 122 shown in FIG. 2. It will be appreciated that, although the levels shown in FIGS. 2–5 are shown relative to the top of the container 112, any reference point may be used to define movement of the buoyant body 116 relative to the container 112.

The level indicator 126 may be coupled to additional electronics and/or an output device (not shown), e.g., by transmitting the electrical signal via a wire or any other suitable conduit to the additional electronics and/or a display device. For example, the electrical signal(s) may be provided to an analog-to-digital converter or other signal conditioning electronics, and/or routed to a digital or analog readout device. The electrical signal(s) may be processed to apply the displacement-to-power relationship, such that the output discuss may display the processed electrical signal(s) as a power intensity indicating the actual power of the acoustic energy directed at the buoyant body 112.

In FIG. 4, the buoyant body 116 is being impinged by acoustic energy 15 from the transducer 14, causing the buoyant body 116 to be elevated to a second level 124. At the second level 124, the level indicator 126 may generate an electrical signal corresponding to the displacement or level of the buoyant body 116. Thus, the electrical signal may correspond to the vertical component of the power of the focused acoustic energy 15 directed towards the focal zone 38. The resulting electrical signal may be transmitted through conduit 128, e.g., to the conditioning electronics and/or a readout (not shown).

Figure 5:
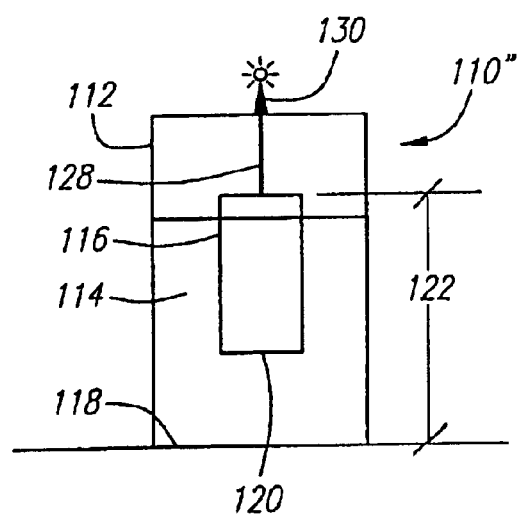
FIG. 5 is a side view of still another apparatus for indicating the power output of an ultrasound transducer.

Turning to FIG. 5, alternatively or in addition, an apparatus 110" is shown that includes a transmitter 130 coupled to the level indicator 126 to output a wireless signal, but is otherwise similar to the other embodiments described above. The signal may be transmitted from the transmitter 130 to a remote location (not shown) for processing and/or display. The apparatus 110" may operate similarly to the embodiments described above, except that a wireless signal (instead of a directly coupled electrical signal) may be generated by the apparatus 110 responding to the level of the buoyant body 116. Thus, a receiver (not shown) may be coupled to a controller (also not shown) for relaying the signals to the controller from the level indicator 126.

Returning to FIG. 4, an electrical signal 128 (or optionally a wireless signal) may be used in a control loop for controlling intensity or power of the acoustic energy 15 transmitted by the transducer 14. In this example, the buoyant body 116 is impinged by acoustic energy 15 generated by the transducer 14 and focused at a focal zone 38 beyond the wave receiving surface 120. This causes the buoyant body 116 to rise to a second level 124, such that the level indicator 126 generates a signal corresponding to the level of the buoyant body 116, and, consequently, to the intensity or power of the acoustic energy 15 at the focal zone 38. The resulting signal(s) 128 from the level indicator 126 may be transferred to the controller 18. As explained above, the controller 18 is coupled to the driver 16, which, in turn, provides drive signals to the transducer 14. The signal(s) 128 may be communicated to the controller 18 via a direct wire coupling, as shown, or using a wireless transmitter/receiver arrangement, as described above.

The controller 18 may perform a variety of operations in response to the signal(s) 128, e.g., to control the transducer 14. For example, the controller 18 may compare the signal (s) 128 output by the apparatus 110' to an input provided by a user, e.g., a desired power intensity. The controller 18 may automatically make adjustments, corrections, and/or calibrations of power of the acoustic energy 15 transmitted by the transducer 14 based upon the signal(s) 128. The controller 18 may control the power output by the transducer 14 by controlling the amplitude, phase, and/or frequency of drive signals provided by the driver 16 to the ultrasound transducer 14. Thus, the system 10 may self-calibrate by processing the signal(s) 128 input to the controller 18, comparing the signal(s) 128 to a target or desired input signal corresponding to the desired power intensity, and automatically adjusting the control signals the controller 18 outputs to the driver 16 accordingly.

Figure 6:
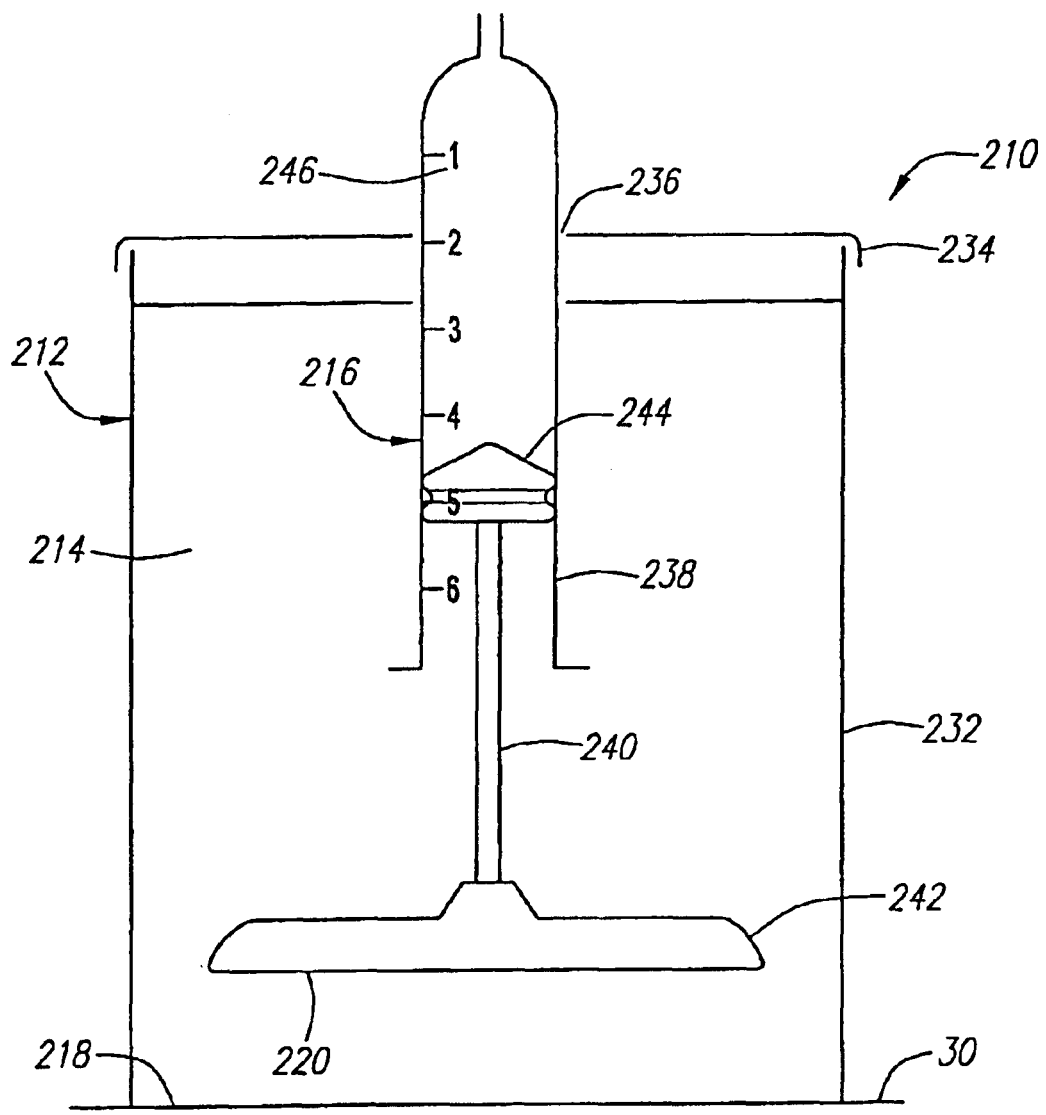
FIG. 6 is a side view of yet another apparatus for indicating the power output of an ultrasound transducer.
Figure 7:
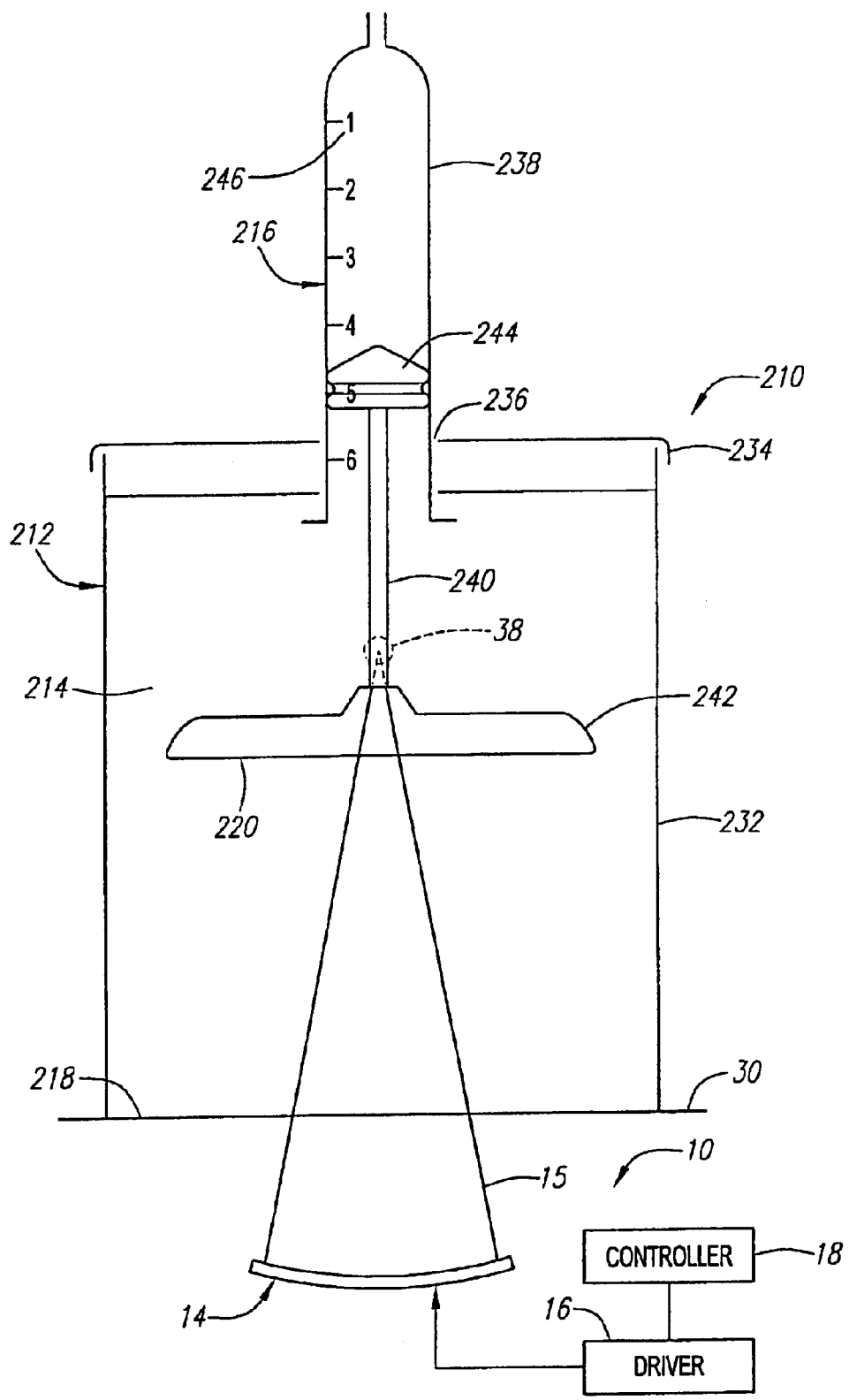
FIG. 7 is a side view of the apparatus of FIG. 6 with an ultrasound transducer directing ultrasonic energy toward the apparatus.

Turning to FIGS. 6 and 7, another embodiment of an apparatus 210 is shown for indicating a magnitude of the power of acoustic energy 15 output by a transducer 14. Unlike the previous embodiments, the apparatus 210 may be field-assembled, if desired. Similar to the previous embodiments, the apparatus 210 generally includes a container 212 and a buoyant body 216 floating in a liquid 214 in the container 212. The container 212 may be a cylindrical barrel 232 or other housing, with a lid 234 or other substantially enclosed top, thereby substantially enclosing an interior of the container 212. The container 212 may be formed from any appropriate material, e.g., plastic, and may have a variety of dimensions that allow the buoyant body 216 to move therein, e.g., having a height of about twenty centimeters (20 cm) and a diameter of about fifteen centimeters (15 cm). The lid 234 includes an opening 236 therethrough for allowing at least a portion of a buoyant body 116 to pass slidably therethrough, as described further below. Optionally, a seal and/or bearing (not shown) may be provided around the opening 236 to slidably seal the buoyant body 216 to the lid.

The buoyant body 116 may include an upper level indicator portion, e.g., a syringe barrel 240, and a lower portion, e.g., a plunger 240 with an enlarged pad 242 thereon defining a wave receiving surface 220 for absorbing acoustic energy. The pad 242 may be more dense than the liquid 214 (as long as the overall density of the buoyant body 216 is less than the density of the liquid 214), e.g., to stabilize the buoyant body 216 in a vertical orientation. In a preferred embodiment, the pad 242 is formed from a polymer, such as rubber, or any suitable material capable of absorbing acoustic energy.

The syringe barrel 238 may be secured relative to the plunger 240. For example, a piston 244 of the plunger 240 may frictionally engage an inner surface of the syringe barrel 238, thereby allowing the location of the plunger 240 to be adjusted, if desired, but otherwise preventing substantial movement of the plunger 240 into or out of the syringe barrel 238. In addition, the syringe barrel 238, e.g., a 10 cc or 20 cc syringe, generally includes demarcations 246 indicating volumetric measurements along the syringe barrel 238.

Before using the apparatus 206, the barrel 232 of the container 212 may be disposed adjacent the transducer 14, e.g., on a membrane covering a table 30 within which the transducer 14 is mounted. The container 212 may be disposed vertically above the transducer 14, and/or the container 212 may be acoustically coupled to the transducer 14, as described above. Liquid 214, e.g., water, may be introduced into the container 212 and filled to a desired level. The buoyant body 216 may be placed into the liquid 114 with the plunger 240 entering first, e.g., initially at an angle to release any air bubbles trapped beneath the pad 242.

The buoyant body 216 may then be released, allowing the buoyant body 216 to float in the liquid 214, e.g., at a first level when the transducer 14 is inactive. The first level may be identified by a first demarcation from the level indicator (e.g., "2" shown in FIG. 6) appearing outside the aperture 214.

Before the buoyant body 216 is placed in the container 212, the plunger 240 may be adjusted axially (vertically in FIGS. 6 and 7) relative to the syringe barrel 238. This may adjust a volume of air within the syringe barrel 238, thereby causing the buoyant body 216 to float at a desired level when the transducer is inactive. Thus, a desired demarcation 246 may show outside the lid 234 of the container 212.

The lid 234 of the container 312 may then be placed on the barrel 232 such that the syringe barrel 238 at least partially extends through the opening 236 in the lid 234.

As shown in FIG. 7, the container 212 may be placed above an ultrasound transducer 14, ensuring proper acoustic coupling between the transducer 14 and the container 212, similar to the examples described above. The transducer 14 may be activated, and acoustic energy 15 may be focused such that the focal zone 38 is located beyond the pad 242. Thus, the acoustic energy 14 may strike the wave receiving surface 220, creating an upward force that causes the buoyant body 216 to rise within the container 212.

If the buoyant body 216 tilts excessively, the apparatus 210 may not be properly centered over the transducer 14. When this happens, the container 212 may be moved in a direction opposite the direction of tilt to align the apparatus 210 over the transducer 14, whereupon the buoyant body 216 should return to a substantially vertical orientation.

The demarcations on the syringe barrel 238 may be observed relative to the opening 236 in the lid 234, and any vertical displacement of the buoyant body 216 relative to the container 212 may be determined. Preferably, if the demarcations 246 indicate volume, the demarcations 246 may be directly correlated to the force of the acoustic energy 15 transmitted by the transducer 14. Displacement of the syringe barrel 238 causes a volume of water equal to the change in volume indicated by the demarcations 246 to be displaced by the acoustic energy 15. This volume is directly proportional to the weight of the displaced water, and therefore to the force of the acoustic energy 15 that is overcoming the gravitational force acting on the weight of the displaced water. Alternatively, if the demarcations 246 do not indicated volume, the apparatus 210 may be calibrated, similar to the embodiments described above.

Thus, the apparatus 210 may be used to measure or otherwise determine power output of the transducer 14 based upon displacement of the buoyant body 216. The observed and/or measured power output may be compared to target or desired power outputs to calibrate or otherwise confirm proper operation of the transducer 14.

While the invention is susceptible to various modifications, and alternative forms, specific examples thereof have been shown in the drawings and are herein described in detail. It should be understood, however, that any of the elements described in any example can be combined with any of the elements of any other example. It should be further understood that the invention is not limited to the particular forms or methods disclosed. To the contrary, the invention covers all modifications, equivalents and alternatives falling within the scope of the appended claims.

What is claimed is:

1. An apparatus for measuring power of acoustic energy transmitted by an ultrasound transducer, comprising:
   a container comprising a fluid having a first density therein;
   a buoyant body floating in the fluid, the buoyant body having a second density less than the first density such that the buoyant body floats at a first level in the fluid in the container when the buoyant body is not impacted by acoustic energy, the buoyant body comprising a wave receiving surface, the buoyant body floating at a second level when the wave receiving surface is impacted by acoustic energy transmitted by an ultrasound transducer, a displaced volume of the buoyant body as it moves between the first and second levels being proportional to the power of the acoustic energy.

2. The apparatus of claim 1, further comprising a level indicator outputting one or more signals corresponding to at least one of a level at which the buoyant body floats in the fluid, and a vertical displacement of the buoyant body relative to a reference point.

3. The apparatus of claim 2, wherein the signals output by the level indicator comprises electrical signals, and wherein the apparatus further comprises control circuitry coupled to the level indicator for receiving the signals output by the level indicator, the control circuitry generating control signals in response to the signals for controlling a power of the acoustic energy output by the ultrasound transducer.

4. The apparatus of claim 2, further comprising a transmitter coupled to the level indicator for outputting one or more wireless signals comprising the one or more signals.

5. The apparatus of claim 4, further comprising control circuitry, the control circuitry comprising a receiver for receiving the wireless signal from the transmitter, the control circuitry configured for generating control signals in response to the wireless signals for controlling the power of the acoustic energy output by the ultrasound transducer.

6. The apparatus of claim 1, wherein the container comprises a first fluid comprising the first density, and a second fluid comprising a third density less than the second density of the buoyant body, the second fluid disposed above the first fluid such that the buoyant body floats at a boundary between the first and second fluids.

7. The apparatus of claim 1, wherein the fluid comprises water.

8. The apparatus of claim 1, further comprising a level indicator for providing a visual indication of displacement of the buoyant body within the fluid.

9. A system for measuring power of acoustic energy of an ultrasound transducer, comprising:
   an ultrasound transducer configured for transmitting acoustic energy towards a target region;
   a container comprising a fluid therein, the container disposed relative to the transducer such that the target region is located at least partially within the fluid in the container; and
   a buoyant body floating in the fluid at a first level when the transducer is inactive, the buoyant body comprising a wave receiving surface oriented towards the transducer such that, when the transducer is activated, acoustic energy transmitted by the transducer strikes the wave receiving surface, causing the buoyant body to float at a second level in the fluid, displacement of the buoyant body between the first and second levels being directly related to the power of the acoustic energy transmitted by the transducer.

10. The system of claim 9, further comprising a level indicator outputting one or more signals corresponding to at least one of a level at which the buoyant body floats in the fluid, and a displacement of the buoyant body relative to a reference point.

11. The system of claim 9, further comprising control circuitry coupled to the level indicator, the control circuitry configured for receiving the signals output by the level indicator, the control circuitry further configured for controlling the power of the acoustic energy transmitted by the transducer in response to the signals.

12. The system of claim 9, wherein the level indicator comprises a transmitter for outputting one or more wireless signals comprising the signals.

13. The system of claim 12, further comprising a receiver coupled to the control circuitry, the receiver configured for receiving the wireless signals from the transmitter, thereby coupling the control circuitry to the level indicator.

14. The system of claim 9, wherein the transducer is disposed within a casing comprising a membrane, and wherein the container is disposed on the membrane such that the container is acoustically coupled to the transducer.

15. The system of claim 9, further comprising a level indicator for providing a visual indication of displacement of the buoyant body within the fluid.

16. A method of measuring power of acoustic energy transmitted by an ultrasound transducer, the method comprising:

provilding a buoyant body floating at a first level in a fluid adjacent an ultrasound transducer;

impinging a surface on the buoyant body with acoustic energy from the transducer, thereby causing the buoyant body to float at a second level in the fluid; and measuring displacement of the buoyant body from the first level to the second level to indicate the power of the acoustic energy impinging the surface of the buoyant body.

17. The method of claim 16, further comprising calibrating the power of acoustic energy transmitted by the transducer by measuring displacement of the buoyant member from the first level to another level caused by a predetermined power of acoustic energy transmitted by the transducer.

18. The method of claim 16, further comprising generating one or more electrical signals indicative of at least one of a level at which the buoyant body floats within the liquid, and a displacement of the buoyant body relative to a reference point.

19. The method of claim 18, further comprising controlling at least one of amplitude, phase, and frequency of the acoustic energy transmitted by the ultrasound transducer in response to the electrical signals.

20. The method of claim 16, wherein the impinging step comprises focusing the acoustic energy towards the surface of the buoyant body.

21. The method of claim 16, wherein the step of providing a buoyant body comprises acoustically coupling the fluid to the transducer.

22. The method of claim 16, wherein the step of providing a buoyant body comprises:

disposing a container adjacent the transducer;

introducing a fluid into the container; and placing the buoyant body in the fluid such that the buoyant body floats at least partially within the fluid.

23. The method of claim 22, wherein the step of providing a buoyant body further comprises placing a lid over the container such that at least a portion of the buoyant body is exposed through an aperture in the lid.

24. The method of claim 23, wherein the step of measuring displacement comprises observing demarcations on the portion of the buoyant body exposed through the aperture in order to measure the displacement of the buoyant body.

* * * * *